US006554945B1

(12) United States Patent
Abe

(10) Patent No.: US 6,554,945 B1
(45) Date of Patent: Apr. 29, 2003

(54) ELECTROSTATIC FLOCKING CHAMBER FOR FORMING ELECTROSTATIC FLOCKING APPARATUS

(75) Inventor: Masaaki Abe, Tokyo (JP)

(73) Assignees: Mesac Corporation, Tokyo (JP); Sumitomo Corporation, Osaka (JP)

( * ) Notice: Subject to any disclaimer, the term of this patent is extended or adjusted under 35 U.S.C. 154(b) by 132 days.

(21) Appl. No.: 09/636,589

(22) Filed: Aug. 10, 2000

(30) Foreign Application Priority Data

Aug. 12, 1999 (JP) .......................................... 11-228366

(51) Int. Cl.[7] ............................................... B32B 31/00

(52) U.S. Cl. ............................... 156/274.4; 156/274.6; 427/462; 427/206

(58) Field of Search .......................... 156/272.2, 273.1, 156/274.4, 274.6; 427/200, 206, 203, 462, 463, 464, 465, 458, 472; 428/90

(56) References Cited

U.S. PATENT DOCUMENTS 2,287,837 A * 6/1942 Smyser ................ 101/DIG. 37
2,328,577 A * 9/1943 Oglesby ...................... 51/295
4,724,664 A * 2/1988 Goerens .................... 118/638

* cited by examiner

*Primary Examiner*—Michael W. Ball
*Assistant Examiner*—John L. Goff
(74) *Attorney, Agent, or Firm*—Rader, Fishman & Grauer PLLC

(57) ABSTRACT

A workpiece is passed at high speed through an electrostatic flocking chamber provided with an inlet opening and an outlet opening, a distance between which openings is increased to realize optimum flocking conditions for the workpiece being electrostatically flocked. In order to conduct an electrostatic flocking operation of the workpiece by having the workpiece traveled at high speed between the inlet opening and the outlet opening, a pair of electrodes are disposed parallel to a passage of the electrostatic flocking chamber, which passage is increased in length to permit the workpiece to pass through the passage at high speed. A high voltage is applied to a first one of the electrodes, while a low voltage lower than the high voltage is applied to a second one of the electrodes, wherein the first and the second electrode are disposed in the inlet opening's side and the outlet opening's side, respectively.

1 Claim, 1 Drawing Sheet

ELECTROSTATIC FLOCKING CHAMBER FOR FORMING ELECTROSTATIC FLOCKING APPARATUS

BACKGROUND OF THE INVENTION

1. Field of the Invention

The present invention relates to an electrostatic flocking apparatus for electrostatically applying flock to a piece of work having an adhesive layer formed thereon (hereinafter referred to as the workpiece) when the workpiece is passed through at high speed an electrostatic flocking chamber in a condition in which the workpiece is electrically grounded, so that a so-called "electrostatic flocking process" is conducted, wherein the flocking process is followed by a drying process serving as an after treatment as is generally conducted to produce a flocked product.

2. Description of the Related Art

An electrostatic flocking apparatus has an essential construction in which: a flocking electrode for creating a high voltage electrostatic field is supported inside a housing through an insulation member, wherein the housing forms an electrostatic flocking chamber; a workpiece is oppositely disposed from, i.e., space a certain distance apart from the flocking electrode, and electrically grounded in a condition in which the workpiece is coated with an adhesive layer and disposed either above or below the flocking electrode, or disposed in the same plane or level as that of the flocking electrode; the electrostatic field is created between the flocking electrode and the workpiece, so that short fibers or fibrils are electrostatically floated and driven to fly parallel to the electric lines of force in the electric field toward the workpiece, whereby the short fibers are implanted in the adhesive layer of the workpiece. Then, the workpiece is subjected to an after treatment through which the workpiece is dried to become a flocked product. In fabrication, it is not unusual for the workpiece to be electrically grounded when the workpiece is supported on a shelf or suspended from an appropriate suspension member, provided both the shelf and the suspension member are electrically grounded. Further, it is also not unusual for the workpiece to be moved from an inlet opening of the housing to its outlet opening in a condition in which any supporing member for supporting the workpiece is used.

Provided in a ceiling portion of the housing is a ventilating apparatus provided with a filter, which filter prevents the floating short fibers from escaping outside from the housing in the electrostatic flocking operation.

Disposed on the side of the inlet opening of the housing is an adhesive applicator apparatus for applying an adhesive to a surface of the workpiece to form an adhesive layer thereon, through the adhesive applicator apparatus the workpiece is introduced into the housing.

Disposed on the side of the outlet opening of the housing is a drying apparatus for drying the flocked workpiece to perform an after treatment thereof when the flocked workpiece passes through the drying apparatus.

The drying apparatus is provided with: a heating unit for drying the adhesive layer having been formed on the surface of the workpiece; and, an exhaust port for discharging vapors or moisture contained in the adhesive layer of the flocked workpiece.

The drying apparatus is followed by a product receiving apparatus which receives the flocked products.

Now, the electrostatic flocking operation of the workpiece performed in a conventional electrostatic flocking apparatus will be described using a system called "up-system" as an example, in which up-system a short fiber reservoir portion is disposed below the housing.

The so-called "workpiece" is prepared by the use of the adhesive applicator apparatus disposed in front of the inlet opening of the housing, in which applicator apparatus an adhesive is applied to the surface of a piece of work being electrostatically flocked, so that an adhesive layer is formed on the work, whereby the work having been coated with the adhesive layer, i.e., the so-called "workpiece" is prepared.

The thus prepared workpiece having the adhesive layer formed thereon is supported by a member having been electrically grounded, introduced into the housing through the inlet opening thereof, and disposed inside the housing. In other words, the workpiece is disposed inside the housing in a condition in which the workpiece is electrically grounded.

At this time, a high voltage is applied to the flocking electrode so that a high voltage electrostatic field is created. Consequently, due to the presence of this electrostatic field, electric lines of force extend from the flocking electrode to the electrically grounded workpiece.

Due to this phenomenon, the short fibers stored in the reservoir portion disposed inside the housing are floated and driven to fly toward the workpiece.

In order to enhance such floatation and flying motion of the short fibers toward the workpiece, a moisture bearing air is blown from the outside into the reservoir portion to permit the short fibers stored in the reservoir portion to take up moisture. Due to this, the short fibers floated in the housing are electrically charged and therefore strongly driven to rush for the workpiece. As a result, the short fibers have their front end portions stuck into the adhesive layer having been applied to the surface of the workpiece, so that the entire surface of the adhesive layer is uniformly covered with the short fibers.

Floating short fibers, which are left over to form excess fibers, reach the ceiling portion of the housing, and are trapped in a filter disposed in the ceiling portion of the housing, while the moisture bearing air is discharged to the outside through an exhaust unit.

The workpiece having subjected to the above operations emerges from the housing through its outlet opening, and then passed through the drying apparatus provided with the heating unit so that the moisture contained in the adhesive of the adhesive layer is evaporated, whereby the short fibers thus stuck in the adhesive layer are firmly implanted in the workpiece in this state.

After completion of the above process, the workpieces (i.e., completed products) are collected.

The electrostatic flocking operation should be performed to satisfy the following necessary conditions: the short fibers are uniformly implanted in the adhesive layer of the workpiece in a manner such that the short fibers are disposed perpendicularly to the surface of the workpiece; excess flocks (i.e., short fibers) are prevented from adhering to the adhesive layer; and, the time and electric energy are saved in the operation.

In a condition in which the housing (not shown) forming the electrostatic flocking chamber of the conventional flocking apparatus described above is not modified at all, the workpiece coated with the adhesive layer is electrically grounded. Under such circumstances, the workpiece is passed at a high speed higher than a predetermined speed through the housing to perform the flocking operation in minimal time in order to improve the operation in efficiency.

However, it is impossible for such unmodified conventional flocking apparatus to produce a flocked product which is equal in quality to that produced in a condition in which the above-mentioned necessary conditions are satisfied. This is shown in FIG. 1. The reason why a phenomenon illustrated in FIG. 1 occurs is that: residence time of the workpiece 1 in the housing (i.e., electrostatic flocking chamber)in which the workpiece 1 is oppositely disposed from a flocking electrode 4 is reduced since the workpiece 1 passes through the housing at high speed. In other words, such high-speed transfer of the workpiece in the housing leads to lack of one of the above-mentioned necessary conditions, which one requires the workpiece 1 to stay in the housing for a predetermined period of time, in which housing an electrostatic field is created between the workpiece 1 and the flocking electrode 4. Further, an additional phenomenon occurs, in which the surface of the workpiece is subjected to the resistance of the air which is not expected. In addition, the short fibers 3, which float and move in a manner such that the front end portions of the short fibers 3 tend to be perpendicularly stuck in the adhesive layer of the workpiece, are obliquely stuck or implanted in the adhesive layer, as shown in FIG. 1, because the short fibers 3 tend to fall in a direction counter to the moving direction of the workpiece 1. In other words, when the workpiece 1 is passed through the housing at high speed, the amount of the short fibers 3 implanted in the workpiece reduces, which is disadvantageous in producing a soundly flocked product.

In order to surmount the above disadvantages, a voltage higher than that used in an ordinary case is applied to the electrode so that a high voltage electrostatic field is created to produce its strong electric lines of force between the workpiece and the electrode, whereby the short fibers are driven to fly toward the workpiece and to have their front end portions deeply stuck in the adhesive layer of the workpiece. However, the above flocking process is disadvantageous in failing to obtain a soundly flocked surface of the product which is poor in quality in spite of considerable consumption of both the electric power and the short fibers.

Further, it is not possible for the conventional drying apparatus used in the electrostatic flocking apparatus to perform a sound drying operation unless the drying apparatus is properly modified, because the transfer speed of the workpiece is too large.

SUMMARY OF THE INVENTION

It is an object of the present invention to provide an technological idea of obtaining a uniformly flocked product having short fibers implanted perpendicularly in its surface as is in the conventional case even when a workpiece coated with an adhesive layer is passed at high speed through both: a housing which forms an electrostatic flocking chamber of an electrostatic flocking apparatus, wherein the housing is modified to improve an electrostatic flocking operation in efficiency; and, a drying apparatus disposed adjacent to the housing.

In accordance with the present invention, the above object of the present invention is accomplished by providing:

In an electrostatic flocking chamber for forming an electrostatic flocking apparatus, comprising: a passage through which a workpiece passes at high speed and is subjected to an electrostatic flocking operation, wherein the workpiece enters an inlet opening of the passage of the chamber to travel across the chamber toward its outlet opening, the improvement wherein:

a distance between the inlet opening and the outlet opening is increased; and the passage of the electrostatic flocking chamber permitting the workpiece to pass through is provided with a pair of electrodes both disposed parallel to the passage, wherein a first one of the electrodes is disposed in the side of the inlet opening and a high voltage is applied to the first electrode, and a second one of the electrodes is disposed in the side of the outlet opening and a low voltage is applied to the second electrode, the low voltage being lower than the high voltage.

Since the prevent invention has the above construction, it is possible to perform at high speed the electrostatic flocking operation, which operation permits the workpiece to pass through the housing at high speed, and is capable of obtaining the flocked product having the short fibers implanted perpendicularly to its surface.

BRIEF DESCRIPTION OF THE DRAWINGS

The above and other objects, advantages and features of the present invention will be more apparent from the following description taken in conjunction with the accompanying drawings in which.

DETAILED DESCRIPTION OF THE PREFERRED EMBODIMENTS

The best modes for carrying out the present invention will be described in detail using embodiments of the present invention with reference to the accompanying drawings.

The present invention may, however, be embodied in various different forms and should not be construed as limited to the embodiments set forth herein; rather, these embodiments are provided so that this disclosure will be thorough and complete, and will fully convey the scope of the present invention to those skilled in the art.

First, the present invention will be described using an up-type electrostatic flocking apparatus as a first embodiment of the present invention.

Figure 2:
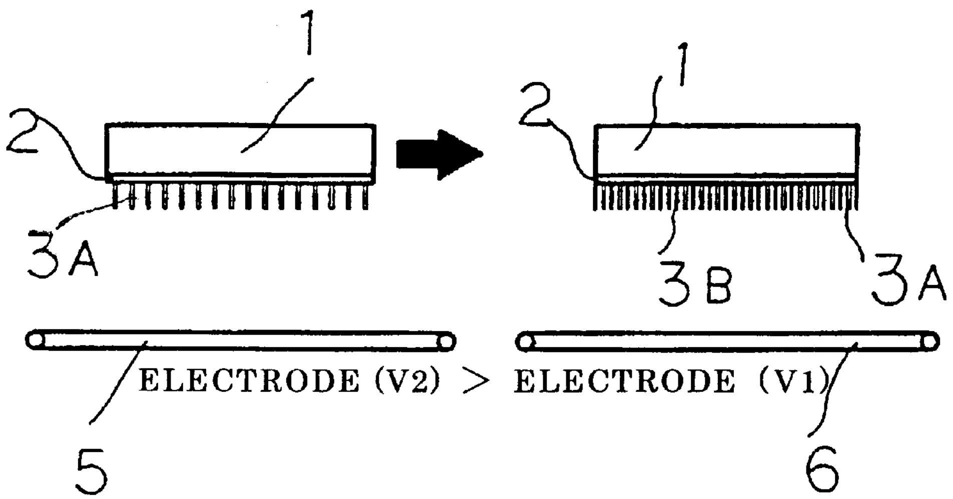
FIG. 2 is a view illustrating a flocked condition of the short fibers which are implanted in the workpiece when the workpiece is passed at high speed through an electrostatic flocking chamber of the present invention.

FIG. 2 shows an electrostatic flocking operation performed inside a housing (not shown). This housing forms an electrostatic flocking chamber of an up-type electrostatic flocking apparatus in which: a pair of electrostatic electrodes 5, 6 are disposed under a workpiece 1 being flocked, wherein the workpiece 1 has been coated with an adhesive to form an adhesive layer 2 on the surface of the workpiece 1; and, flocks or short fibers are implanted from under the workpiece 1.

The housing is provided with an inlet opening and an outlet opening through both of which openings the workpiece 1 provided with the adhesive layer 2 is passed through the housing. A ventilating or exhaust unit provided with a filter is provided in a ceiling portion of the housing.

Formed in a bottom portion of the housing is a fiber reservoir portion for storing the short fibers. This reservoir portion is provided with a blow-off opening through which a moisture bearing air is blown from a moisture-bearing air supply unit into the reservoir portion to permit the short fibers to take up moisture and float in the housing. The moisture-bearing air supply unit is disposed outside the housing.

Disposed above the fiber reservoir portion are the so-called “flocking electrodes”.

One of the flocking electrodes is constructed of a flocking electrode 5 which is disposed in the side of the inlet opening of the housing and adapted to apply a high voltage. The other of the flocking electrodes is constructed of a flocking electrode 6 which is disposed in the side of the outlet opening of the housing so as to be disposed adjacent to the flocking electrode 5, and is adapted to apply an ordinary voltage lower than the above-mentioned high voltage.

Disposed adjacent to the outlet opening of the housing is a drying apparatus which is capable of drying the flocked workpiece 1 and permitting the workpiece 1 to keep its moving when dried. The drying apparatus is provided with a heating unit. Further, the drying apparatus is provided with an exhaust port and a dry-air supply port.

Next, a flocking process performed in the electrostatic flocking apparatus will be described.

Both a high-voltage generator for supplying high-voltage electrostatic energy to the flocking electrode 5 and an ordinary-voltage generator for supplying ordinary-voltage electrostatic energy to the flocking electrode 6 are operated, so that these electrodes 5, 6 are electrostatically charged.

Then, by operating the moisture-bearing air supply unit, a moisture bearing air is blown from the moisture-bearing air supply unit into the fiber reservoir portion.

Due to the above air supply operation, the short fibers stored in the fiber reservoir portion are floated in the housing.

Under such circumstances, in a condition in which the workpiece 1 is electrically grounded, the workpiece 1 enters the housing through its inlet opening, passes at high speed through the interior of the housing, and emerges from the housing through its outlet opening.

When the workpiece 1 passes through the interior of the housing at high speed, an electric discharge phenomenon occurs between the workpiece 1 and the flocking electrodes 5, 6, wherein the electrode 5 and 6 are charged with a high voltage and an ordinary voltage, respectively. Such discharge phenomenon is resulted from formation of an electrostatic field producing electric lines of force, which lines are issued from the flocking electrodes 5, 6 to the workpiece 1.

In other words, as for the above discharge phenomenon, a strong electrostatic field is created between: the flocking electrode 5 disposed in the vicinity of the inlet opening of the housing and charged with the high voltage; and, the workpiece 1. Such a strong electrostatic field produces strong electric lines of force issued from the electrode 5 to the workpiece 1.

Consequently, when the workpiece 1 passes over the electrode 5, short fibers 3A floating in the housing have their front end portions strongly stuck into the adhesive layer 2 of the workpiece 1. In other words, the short fibers 3A are firmly implanted in the adhesive layer 2 of the workpiece 1. More specifically, the short fibers 3A is aligned with the electric lines of force, and therefore stuck perpendicularly and steadily into the adhesive layer 2 of the workpiece 1.

This phenomenon is realized by applying a high voltage to the flocking electrode 5 even when the workpiece 1 is transferred at high speed in the interior of the housing.

Figure 1:
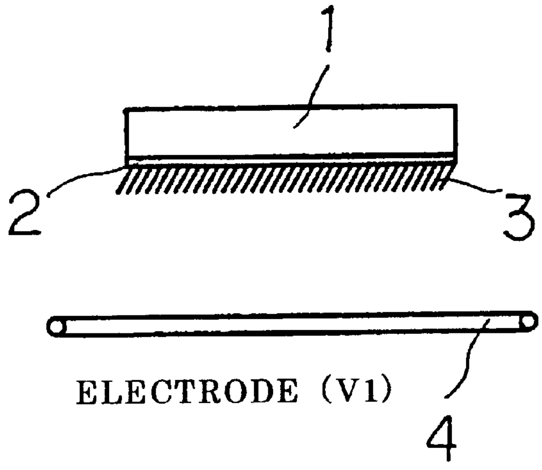
FIG. 1 (PRIOR ART)
FIG. 1 is a view illustrating a flocked condition of the short fibers which are implanted in the workpiece when the workpiece is passed at high speed through the conventional electrostatic flocking chamber.

Due to this phenomenon, when the workpiece 1, which has the short fibers 3A implanted in its surface and has passed through a portion where the electrode 5 is arranged, passes over the electrode 6 charged with the ordinary voltage, an ordinary voltage electrostatic field is created between the workpiece 1 and the electrode 6 charged with the ordinary voltage, so that ordinary intensity electric lines of force are formed between the workpiece 1 and the electrode 6. On the other hand, short fibers 3B floating and moving toward the workpiece 1 in the electrostatic field enter spaces formed between any adjacent ones of the short fibers 3A having been perpendicularly implanted in the workpiece 1 and implanted in the workpiece 1 in a condition in which the short fibers 3A function to support the short fibers 3B. In other words, the short fibers 3A, 3B are so implanted as to be perpendicular to the surface of the workpiece 1, in contrast with the implantation condition shown in FIG. 1.

Incidentally, it is natural that an appropriate value of electrostatic voltage for effecting the above function is applied to the electrode 6 being charged with the ordinary voltage.

After completion of this flocking operation, the workpiece 1 passes through the drying apparatus disposed adjacent to the housing. At this time, i.e., when the workpiece 1 passes through the drying apparatus, any moisture contained in the adhesive of the adhesive layer 2 of the workpiece 1 passing through the drying apparatus is heated and evaporated by the heating unit which functions to dry the interior of the drying apparatus, so that the evaporated moisture (i.e., vapor) is removed to the outside from the interior of the drying apparatus through the exhaust port.

Due to this, vapor pressure to which the surface of the workpiece 1 is subjected is reduced to enhance evaporation of the moisture contained in the adhesive of the adhesive layer 2, so that the drying operation of the workpiece 1 performed in the drying apparatus is enhanced.

In the above embodiment, the drying operation of the workpiece 1 has been described so as to be performed in a condition in which the workpiece 1 is electrically grounded and transferred through the housing in this grounded condition when flocked, and is thereafter dried when moved in the drying apparatus. More specifically, in fabrication of the flocked product, a suitable suspension member (not shown) capable of suspending the workpiece 1 therefrom or a suitable belt conveyor (not shown) capable of carrying the workpiece 1 thereon is used to transfer the workpiece 1 through the housing and the drying apparatus. It is also possible to use any delivery apparatus and any winder or take-up apparatus in place of such suspension member and the belt conveyor when the workpiece 1 assumes a strip-like elongated shape, wherein the strip-like workpiece 1 wound on the delivery apparatus is electrically grounded. In this grounded condition, the strip-like workpiece 1 is unwound and delivered so as to pass through the housing in which the strip-like workpiece 1 is electrostatically flocked. After that, the strip-like workpiece 1 is transferred to the drying apparatus, and is then wound on the take-up apparatus to become a flocked product.

It is also natural that the present invention is carried out in any other types of the electrostatic flocking apparatus, for example such as: a down-type in which the flocking electrodes are disposed over the workpiece; a side type in which the flocking electrodes are disposed in the same plane as that of the workpiece and, like types.

Finally, the present application claims the Convention Priority based on Japanese Patent Application No. Hei 11-228366 filed on Aug. 12, 1999, which is herein incorporated by reference.

What is claimed is:

1. In an electrostatic flocking chamber for forming an electrostatic flocking apparatus, comprising: a passage through which a workpiece (1) having an adhesive-covered surface passes at a predetermined speed and is subjected to an electrostatic flocking operation using short fibers (3A, 3B), wherein said workpiece (1) enters an inlet opening of said passage of said chamber to travel across said chamber toward its outlet opening, wherein said passage of said electrostatic flocking chamber permitting said workpiece (1) to pass therethrough is provided with a pair of electrodes (5, 6) both disposed parallel to said passage, wherein a first one (5) of said electrodes (5, 6) is disposed in the side of said inlet opening and a first voltage is applied to said first electrode (5), and a second one (6) of said electrodes (5, 6) is disposed in the side of said outlet opening, wherein said first voltage causes initial ones (3A) of said short fibers (3A, 3B) to be perpendicularly implanted into the adhesive-covered surface of said workpiece (1) in the side of said inlet opening, the improvement wherein:

said predetermined speed is higher than a conventional speed at which said workpiece (1) travels through a conventional passage of a conventional electrostatic flocking chamber;

said electrostatic flocking chamber is longer in passage than said conventional chamber;

said second one (6) of said electrodes (5, 6) is disposed adjacent to said first one (5) of said electrodes (5, 6); and a second voltage is applied to said second electrode (6), which voltage is lower than said first voltage, to have the subsequent ones (3B) of said short fibers (3A, 3B) enter spaces formed among the implanted initial ones (3A) of the short fibers (3A, 3B) in the side of said outlet opening, perpendicularly implanted into the adhesive-covered surface of said workpiece (1) and therefore supported by the implanted initial ones (3A) of the short fibers (3A, 3B).

* * * * *